US007480799B2

(12) United States Patent
Champion

(10) Patent No.: US 7,480,799 B2
(45) Date of Patent: Jan. 20, 2009

(54) TRAFFIC MANAGER FOR DISTRIBUTED COMPUTING ENVIRONMENTS

(75) Inventor: Kerry Champion, Menlo Park, CA (US)

(73) Assignee: Actional Corporation, Bedford, MA (US)

( * ) Notice: Subject to any disclaimer, the term of this patent is extended or adjusted under 35 U.S.C. 154(b) by 739 days.

(21) Appl. No.: 10/015,502

(22) Filed: Dec. 11, 2001

(65) Prior Publication Data

US 2003/0110373 A1    Jun. 12, 2003

(51) Int. Cl.
*H04L 9/00* (2006.01)
(52) U.S. Cl. .................. 713/167; 713/164; 713/150
(58) Field of Classification Search ............... 713/153; 726/26, 27
See application file for complete search history.

(56) References Cited

U.S. PATENT DOCUMENTS

| | | | | |
|---|---|---|---|---|
| 6,801,604 | B2* | 10/2004 | Maes et al. | 379/88.17 |
| 6,807,636 | B2* | 10/2004 | Hartman et al. | 713/201 |
| 2002/0026473 | A1 | 2/2002 | Gourraud | |
| 2002/0161826 | A1* | 10/2002 | Arteaga et al. | 709/203 |
| 2003/0005174 | A1* | 1/2003 | Coffman et al. | 709/318 |
| 2003/0061404 | A1* | 3/2003 | Atwal et al. | 709/328 |
| 2003/0074579 | A1* | 4/2003 | Della-Libera et al. | 713/200 |

OTHER PUBLICATIONS

Christensen, Erik, et al., *Web Services Description Language (WSDL) 1.1.*, World Wide Web Consortium, W3C Note Mar. 15, 2001, <http://www.w3.org/TR/wsdl>, pp. 1-40, downloaded Jul. 11, 2003.

Bray, Tim, et al., *Extensible Markup Language (XML) 1.0* (Second Edition), World Wide Web Consortium, W3C Recommendation Oct. 6, 2001, <http://www.w3.org/TR/REC-xml>, pp. 1-44, downloaded Jul. 11, 2003.

Fallside, David C., *XML Schema Part 0: Primer*, World Wide Web Consortium, W3C Recommendation, May 2, 2001, <http://www.w3.org/TR/xmlschema-0/>, pp. 1-57, downloaded Jul. 11, 2003.

Clark, James, et al., *XML Path Language (Xpath)*, World Wide Web Consortium, W3C Recommendation, Nov. 16, 1999, <http://www.w3.org/TR/xpath>, pp. 1-28, downloaded Jul. 11, 2003.

(Continued)

*Primary Examiner*—Pramila Parthasarathy
(74) *Attorney, Agent, or Firm*—Fenwick & West LLP

(57) ABSTRACT

Techniques suitable for facilitating communications between various computer programs operating on various nodes in a distributed computing environment are disclosed. The techniques can be used by a traffic manager operating in such environments. The traffic manager is capable of monitoring traffic exchanged between client and server programs operating in the distributed computing environment. Moreover, the traffic manager can be used to implement a variety of desirable features across different computing environments. These computing environments are typically separated by one or more distinguishing characteristics. As will be appreciated, the traffic manager provides an integral and cost effective solution which can bridge these distinguishing characteristics as well as define and enforce policies across disparate computing environments. This is achieved by centralizing the generation of interfaces which allow interaction between any of the nodes in a distributed computing system. This avoids the redundancy and inefficiency inherent in building these capabilities in each node, particularly in complex systems.

45 Claims, 11 Drawing Sheets

OTHER PUBLICATIONS

Thompson, Henry S., et al., *XML Schema Part 1: Structures*, World Wide Web Consortium, W3C Recommendation, May 2, 2001, <http://www.w3.org/TR/xmlschema-1/>, pp. 1-151, downloaded Jul. 11, 2003.

Biron, Paul V., et al., *XML Schema Part 2: Datatypes*, World Wide Consortium, W3C Recommendation, May 2, 2001, <http://www.w3.org/TR/xmlschema-2/>, pp. 1-116, downloaded Jul. 11, 2003.

Clark, James, *XSL Transformations (XSLT) Version 1.0*, World Wide Web Consortium, W3C Recommendation, Nov. 16, 1999, <http://www.w3.org/TR/xslt>, pp. 1-119, downloaded Jul. 23, 2003.

Box, Don, et al., *Simple Object Access Protocol (SOAP) 1.1*, World Wide Web Consortium, W3C Note, May 8, 2000, <http://www.w3.org/TR/2000/NOTE-SOAP-20000508/>, pp. 1-27, downloaded Jul. 23, 2003.

Merrick, Phillip, et al., *Web Interface Definition Language (WIDL)*, World Wide Web Consortium, Submitted to W3C Sep. 22, 1997, © 1997 webMethods, Inc. <http://www.w3.org/TR/NOTE-widl>, pp. 1-15, downloaded Aug. 11, 2003.

Barton, John J., et al., *SOAP Messages with Attachments*, World Wide Web Consortium, W3C Note Dec. 11, 2000, <http://www.w3.org/TR/SOAP-attachments>, pp. 1-8, downloaded Jul. 24, 2003.

Copyright © UN/CEFACT and Oasis, 2001, *Message Service Specification, ebXML Transport, Routing, & Packaging, Verion 1.0*, May 11, 2001, <http://www.ebxml.org/specs/ebMS.pdf>, pp. 1-75.

Copyright © Oasis, 2001, *Oasis/ebXML Registry Information Model v1.0 Draft, Oasis/ebXML Registry Technical Committee*, Jun. 27, 2001, <http://www.oasis-open.org/committees/regrap/documents/rimv1.0.doc>, pp. 1-43.

U.S. Appl. No. 10/015,501, filed Dec. 11, 2001, Champion.

* cited by examiner

TRAFFIC MANAGER FOR DISTRIBUTED COMPUTING ENVIRONMENTS

CROSS-REFERENCE TO RELATED APPLICATIONS

This application is related to U.S. patent application Ser. No. 10/015,501, also entitled "TRAFFIC MANAGER FOR DISTRIBUTED COMPUTING ENVIRONMENTS," filed concurrently herewith, and hereby incorporated herein by reference.

BACKGROUND OF THE INVENTION

1. Field of the Invention

The present invention relates to distributed computing environments, and more particularly to communication between various programs operating in the distributed computing environments.

2. Description of the Related Art

Recently, distributed computing environments have become widespread. Accordingly, extensive efforts have been made to facilitate communication between the various computing nodes which typically operate in such environments. One such effort is the development of the Simple Object Access Protocol (SOAP). SOAP is a standard which can be used to facilitate communication between different computing nodes operating in different platforms (or operating systems). As such, SOAP provides a way for a computing program (program) running in one kind of operating system (e.g., Windows 2000) to communicate with another computer program which is running in another kind of operating system (e.g., Linux).

Typically SOAP uses Extensible Markup Language (XML) and a transport protocol (such as HTTP, SMTP, MQ, etc.) as the mechanisms for information exchange. SOAP specifies how to encode an XML file so that a computer program running in one computer can call a computer program in another computer. This allows the computer program running in the first computer to send information to the program running in the other computer (e.g., one program to call another program). In addition, SOAP specifies how the called program can return a response. Since HTTP and XML Web protocols are usually installed and available for use in most operating platforms, SOAP provides a readily available solution to the difficult problem of allowing computer programs running in different environments to communicate with each other.

A major design goal for SOAP is simplicity and extensibility. This means that there are several features of traditional messaging systems and distributed object systems that are not part of the core SOAP specification. Accordingly, SOAP can be used as a lightweight protocol for exchange of information in a decentralized, distributed environment. As an XML based protocol, SOAP can consist of three parts: an envelope that defines a framework for describing what is in a message and how to process it, a set of encoding rules for expressing instances of application-defined data types, and a convention for representing remote procedure calls (RPC) and responses. The SOAP envelope construct defines an overall framework for expressing what is in a message, who should deal with it, and whether it is optional or mandatory. The SOAP encoding rules define a serialization mechanism that can be used to exchange instances of application-defined data types. The SOAP RPC representation defines a convention that can be used to represent remote procedure calls and responses. SOAP does not itself define any application semantics, such as a programming model or implementation specific semantics. Instead, it defines a simple mechanism for expressing application semantics by providing a modular packaging model and encoding mechanisms for encoding data within modules. This allows SOAP to be used in a large variety of systems. Accordingly, it highly desirable to provide a communication environment which can use SOAP or similar protocols.

Unfortunately, conventional approaches fail to solve many other problems associated with communication between computer programs in distributed computing environments. One such shortcoming is that the conventional approaches fail to provide a solution which can simultaneously and efficiently bridge the many disparate characteristics which typically exist between the nodes that make up a distributed computing environment. Even in cases where a solution can be provided to account for a particular type of difference (e.g., relating to security features) between various nodes, typically a costly and/or ad hoc approach is used. To illustrate, FIG. 1 depicts a conventional distributed computing environment 100. As shown in FIG. 1, several interfaces are implemented and maintained to facilitate communication between a few client and server programs.

Accordingly, conventional approaches do not provide a comprehensive approach to bridging these differences. This means that in order to facilitate communication between the numerous nodes and programming environments that typically make up a distributed computing environment, a tremendous amount of resources have to be deployed to painstakingly implement each desirable feature between each and every program on each and every node. The inefficiencies inherent in such an approach are manifest.

In view of the foregoing, improved techniques for allowing communication in distributed computing environments are needed.

SUMMARY OF THE INVENTION

Broadly speaking, the invention relates to techniques suitable for facilitating communication between various computer programs operating on various nodes in a distributed computing environment. In accordance with one aspect of the invention, a traffic manager is disclosed. The traffic manager is capable of monitoring traffic exchanged between client and server programs operating in the distributed computing environment. Moreover, the traffic manager can be used to implement a variety of desirable features across different computing environments. These computing environments are typically separated by one or more distinguishing characteristics. As will be appreciated, the traffic manager provides an integral and cost effective solution which can bridge these distinguishing characteristics as well as define and enforce policies across disparate applications and computing environments.

According to various embodiments, this is achieved by centralizing the generation of interfaces which allow interaction between any of the nodes in a distributed computing system. That is, instead of enabling each node to generate the necessary interfaces for communicating with each other type of node in the system, the present invention abstracts and centralizes this function so that a single node or set of nodes is responsible for affecting the communications between disparate nodes. This avoids the redundancy and inefficiency inherent, particularly in complex systems, in building these capabilities in each node. Another advantage is that the present invention can provide control for enforcing Information Technology (IT) an/or business policies and procedures. This can be achieved when the interfaces are compatible or incompatible.

The invention can be implemented in numerous ways, including as a method, an apparatus, and computer readable media. Several embodiments of the invention are discussed below.

As a computer-implemented method for implementing security for SOAP messages which can be exchanged between client and server programs, one embodiment of the invention includes the acts of: receiving a SOAP message; determining whether at least one security rule is associated with the SOAP message, the least one security rule being associated with a security policy for SOAP messages which can be exchanged between at least one client program and at least one server program; and performing at least one operation based on the at least one security rule when the determining determines that at least one security rule is associated with the SOAP message.

As a computer-implemented method for protecting a server program from service attacks, one embodiment of the invention includes the acts of: receiving a SOAP message; determining whether at least one rule is associated with the SOAP message; collecting data that may be required to evaluate the at least one rule; evaluating the at least one rule at least partially based on the collected data; and determining whether the SOAP message constitutes a service attack based on the evaluating of the at least one rule.

As a computer-implemented method of controlling publication of or access to a SOAP interface associated with one or more server programs, one embodiment of the invention includes the acts of: identifying a SOAP interface for which publication or access is requested; determining whether one or more rules are associated with the SOAP interface, evaluating the SOAP interface; and determining whether publication of or access to the SOAP interface should be granted based on the evaluating of the SOAP interface. It should be noted that the one or more rules can describe one or more policies with respect to publication of or access to the SOAP interface.

As a computer-implemented method for processing SOAP messages, another embodiment of the invention includes the acts of: receiving a SOAP message; determining whether at least one rule is associated with the SOAP message; evaluating the at least one rule based on at least one portion of the SOAP message; and determining whether an action should be taken with respect to the SOAP message based on the evaluating of the at least one rule.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background, extensive efforts have been made to facilitate communication between various computing nodes which make up a distributed computing environment. Unfortunately, conventional approaches fail to solve many problems associated with communication between computer programs in distributed computing environments. One such shortcoming is that the conventional approaches fail to provide a solution which can simultaneously and efficiently bridge the many disparate characteristics which typically exist between the nodes that make up a distributed computing environment.

Accordingly, the invention pertains to techniques suitable for facilitating communication between various computer programs operating on various nodes in a distributed computing environment. In accordance with one aspect of the invention, a traffic manager is disclosed. The traffic manager is capable of monitoring traffic exchanged between client and server programs operating in the distributed computing environment. Moreover, the traffic manager can be used to implement a variety of desirable features across different computing environments. These computing environments are typically separated by one or more distinguishing characteristics. As will be appreciated, the traffic manager provides an integral and cost effective solution which can bridge these distinguishing characteristics as well as define and enforce policies across disparate applications and computing environments.

According to various embodiments, this is achieved by centralizing the generation of interfaces which allow interaction between any of the nodes in a distributed computing system. That is, instead of enabling each node to generate the necessary interfaces for communicating with each other type of node in the system, the present invention abstracts and centralizes this function so that a single node or set of nodes is responsible for affecting the communication between disparate nodes. This avoids the redundancy and inefficiency inherent in building these capabilities in each node, particularly in complex systems. Another advantage is that the present invention can provide control for enforcing Information Technology (IT) and/or business policies and procedures. This can be achieved when the interfaces are compatible or incompatible.

Embodiments of the invention are discussed below with reference to FIGS. 2-8. However, those skilled in the art will readily appreciate that the detailed description given herein with respect to these figures is for explanatory purposes as the invention extends beyond these limited embodiments.

Figure 1:
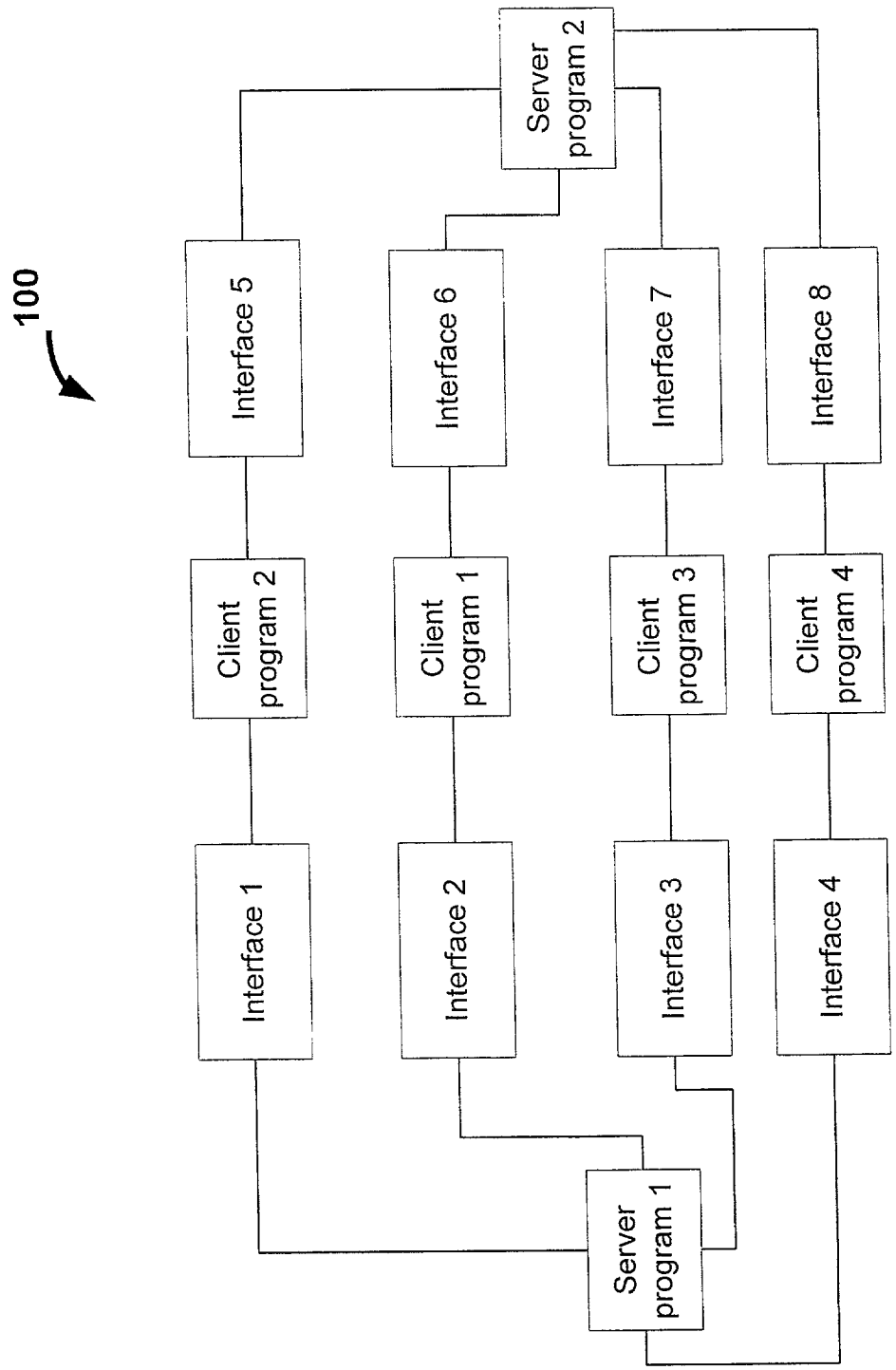
FIG. 1 depicts a conventional distributed computing environment.
Figure 2:
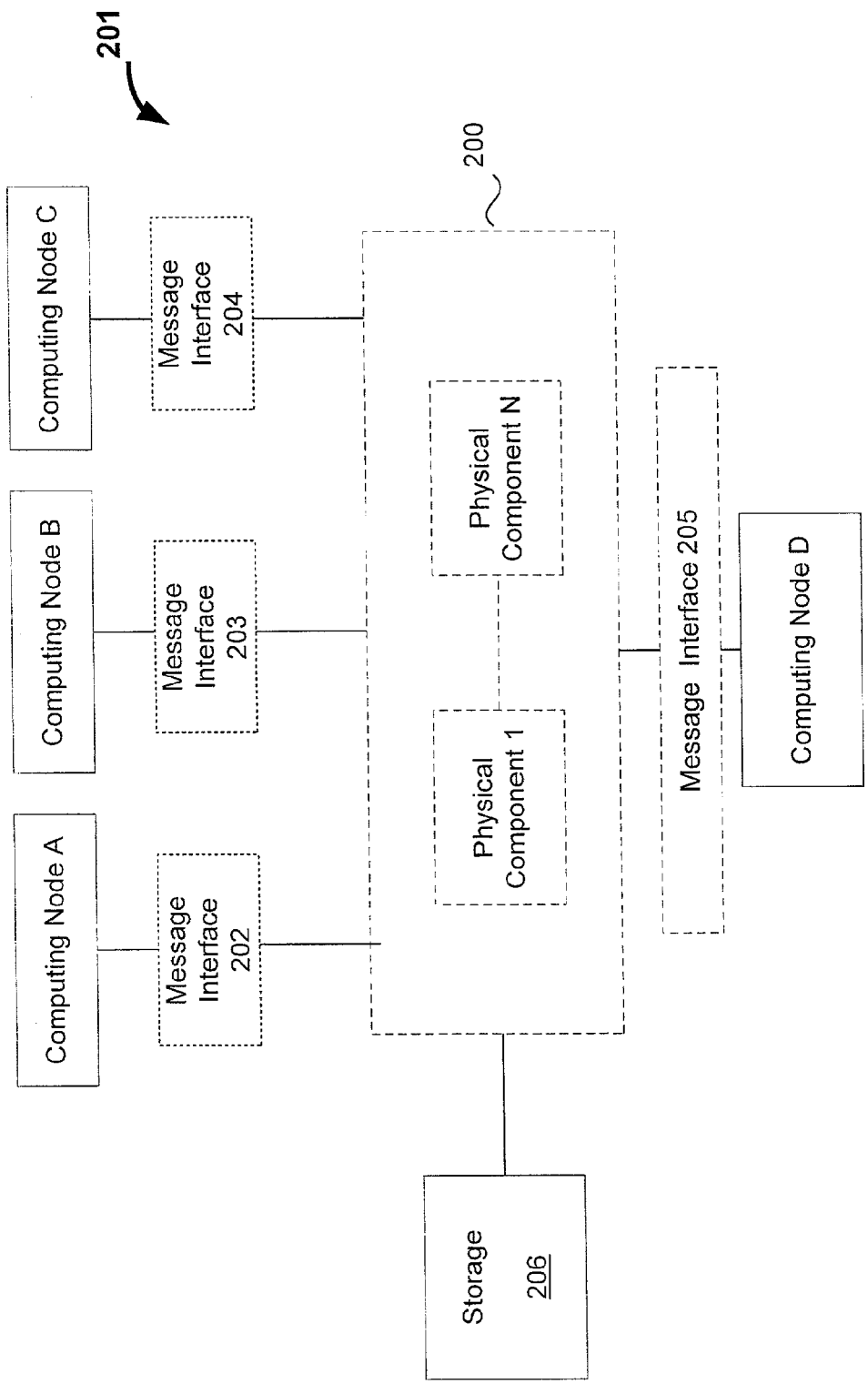
FIG. 2 is a simplified block diagram of a computing environment with reference to which a generalized embodiment of the present invention is described.

FIG. 2 is a simplified block diagram of a computing environment 201 with reference to which a generalized embodiment of the present invention will be described. The distributed computing environment 201, which can be any of a wide variety of distributed computing environments, includes computing nodes A, B and C which can communicate with the computing node D. By way of example, various client programs can be running in each of the computing nodes A, B, and C and a server program can be running in the node D. Typically, the client programs running in the computing nodes A, B and C request one or more services from one or more server programs running in the computing node D. These requests for services are managed by the intermediary traffic manager 200 as described below.

As will be appreciated, the traffic manager 200 can be implemented using one or more physical components (physical components 1-N). Each of these physical components can, for example, be a computing node with memory and a central processing unit. In any case, the traffic manager 200 facilitates communication between any of the computing nodes in the distributed computing environment 201. Traffic manager 200 can publish one or more message interfaces, for example, message Interfaces 202, 203 and 204. The message Interfaces 202, 203 and 204 can respectively be used by the computing nodes A, B and C. In other words, various client programs running on different computing nodes in the computing environment 201 can use a different message interface in order to invoke services which are provided by one or more programs running on computing node D.

According to a more specific embodiment, the traffic manager 200 operates to manage the data traffic in the computing environment 201. That is, the traffic manager 200 monitors the data generated by the computing nodes A, B and C and determines whether the data should be transmitted to the computing node D. Moreover, the traffic manager 200 maps a set of service requests generated by the client programs running in computing nodes A, B and C into a set of service requests which are directed to one or more server programs running in the computing node D. As such, the traffic manager 200 may perform a mapping between two application interfaces.

As illustrated in FIG. 2, the traffic manager 200 can facilitate mapping of, for example, the message interface 202 to a second message interface 205. As will be appreciated, this mapping can be done based on at least one policy. Such policies are typically implemented to bridge one or more disparate characteristics that exist between the computing nodes A, B, C, and D, and/or to enforce common procedures or policies within a homogenous environment and may be implemented using rules stored in a storage medium 206 associated with the traffic manager 200.

Figure 3A:
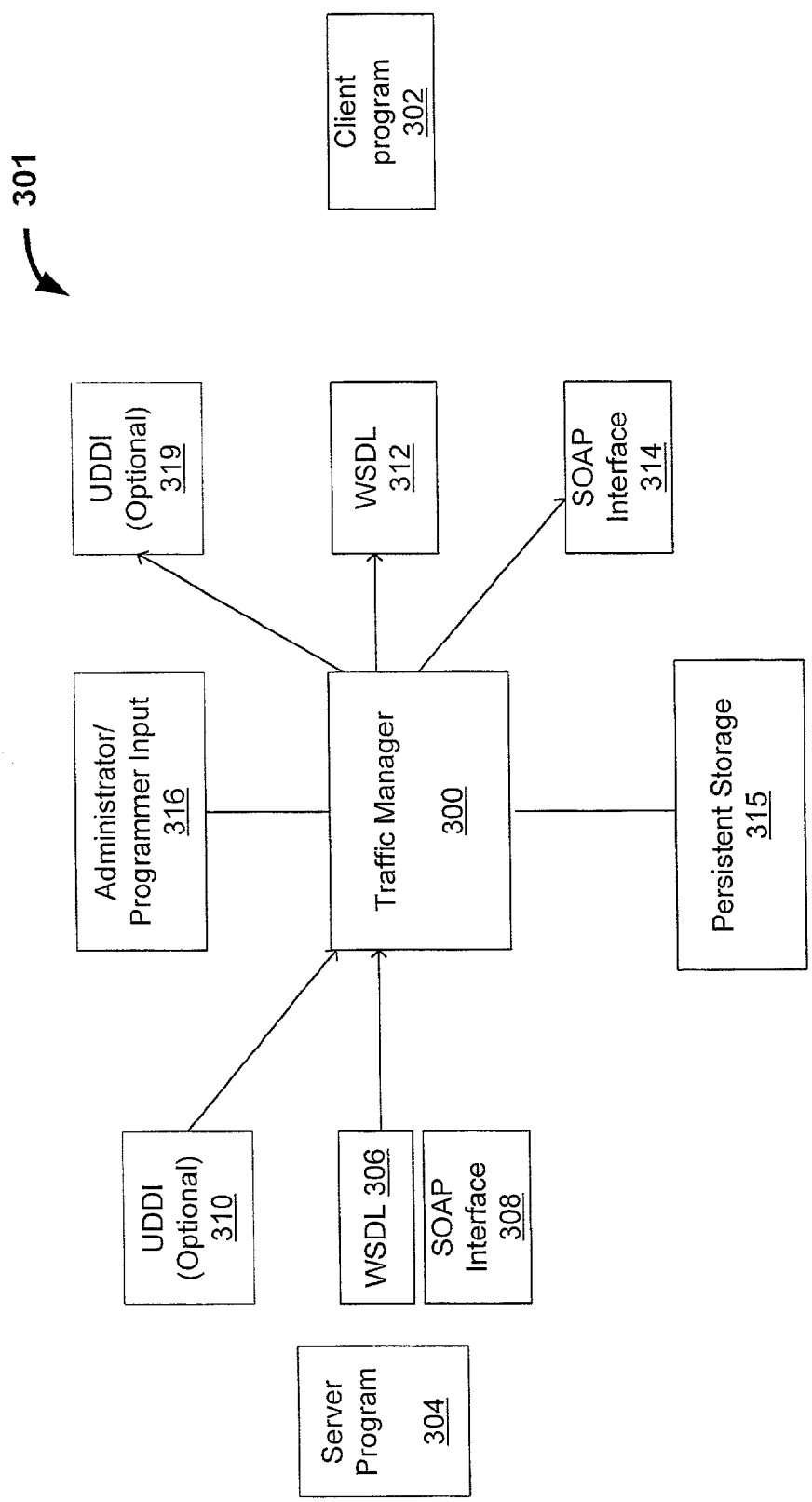
FIGS. 3A-3B illustrate a traffic manager operating in a distributed computing environment in accordance with a more specific embodiment of the invention.

FIG. 3A illustrates a traffic manager 300 operating in a distributed computing environment 301 in accordance with a more specific embodiment of the invention. In the described embodiment, the traffic manager 300 uses the Simple Object Access Protocol (SOAP) in order to facilitate communication between a client program 302 and a server program 304. Programs 302 and 304 may each reside on one or more computing nodes in any of a wide variety of network topologies. For example, client program 302 may reside on a single client machine while server program 304 is distributed across a plurality of servers. In addition, the nodes on which programs 302 and 304 reside may be on the same local area network (LAN) or in a wide area network (WAN) such as the Internet or World Wide Web. Regardless of the network topology in which the programs are operating, the traffic manager 300 allows the client program 302 to access (or invoke) one or more services provided by the server program 304 using the Simple Object Access Protocol. The data transmitted between programs 302 and 304 can be, for example, in Extensible Markup Language (XML) format. It should be noted that other formats, for example, multimedia formats or office file formats (e.g., .jpeg, .wav, .doc, etc.) can be attached.

In response, for example, to a request received from the client program 302, the traffic manager 300 can read a Web Services Description Language (WSDL) file 306 associated with server program 304. The WSDL 306 provides a detailed technical description specifying a SOAP interface 308. The SOAP interface 308 is the interface to the one or more services which are provided by the server program 304. As such, the WSDL provides information about interface 308 so that these services can be accessed. It should be noted that an optional Universal Description, Discovery and Integration directory (UDDI) 310 may initially be accessed in order to, among other things, get information about the WSDL file 306.

In any case, after the traffic manager 300 reads the WSDL file 3067 the traffic manager can generate and/or publish one or more corresponding WSDL file 312 and a corresponding SOAP interface 314. In other words, the traffic manager 300 can generate one or more SOAP interfaces (e.g., SOAP Interface 314 shown in FIG. 3A). Typically, the traffic manager 300 may generate multiple variants of the underlying interface (not shown). For example, different variants of the SOAP interface for each security model and/or for different business partners can be generated.

The SOAP Interface 314 may also provide a common interface by which client program 302 and any other program or node in the system may transparently invoke one or more services associated with the server program 304. According to specific embodiments, WSDL file 312 and SOAP interface 314 are generated at least partially based on data stored in a persistent storage medium 315. The data stored in the persistent storage medium 315 can, for example, include rules, policies, a mapping of users with organizational roles (e.g., an LDAP directory), etc. As will be appreciated, these can be used, for example, to define interfaces, approve interfaces, define policies and rules, review operational data, etc.

According to one embodiment, a person (e.g., application developer and/or business analyst, etc.) 316 may interact with the traffic manager 300, for example, through a Graphical User Interface. Accordingly, the WSDL file 312 and SOAP Interface 314 can be generated by the traffic manager 300 at least partly based on input provided by a person. It should also be noted that the traffic manager 300 may optionally publish the WSDL file 312 in a UDDI 319.

Figure 3B:
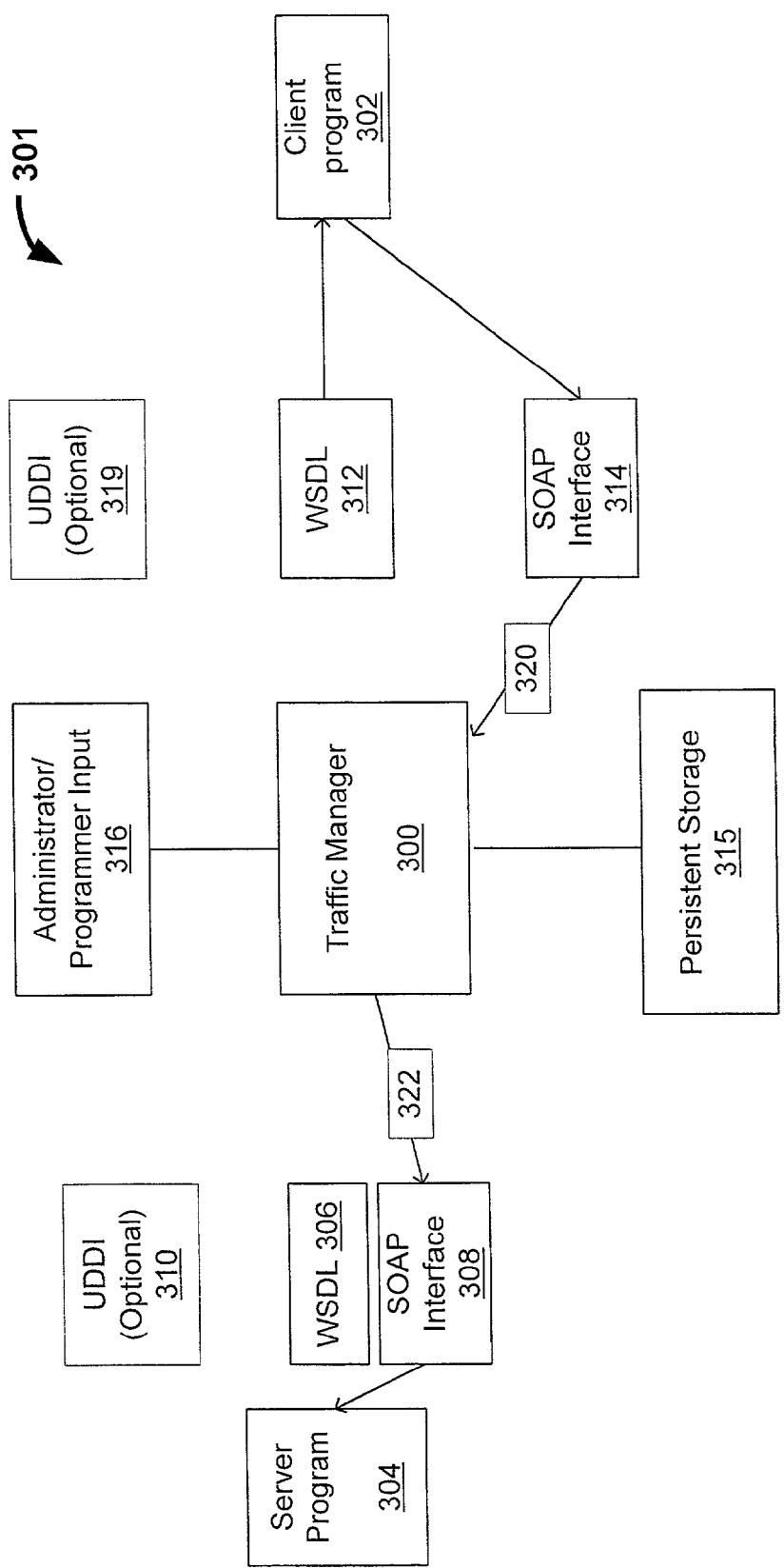

As noted above, the traffic manager 300 generates the corresponding SOAP Interface 314 for the SOAP Interface 308. Accordingly, the client program 302 can access (or invoke) the services provided by the server program 304 through the SOAP interface 314. Referring to FIG. 3B, the client program 302 reads the WSDL file 312 in order to obtain information regarding the SOAP Interface 314. It should be noted that the client program 302 may initially access the optional UDDI 319 in order to locate the WSDL 312 file. In any case, after the client program 302 reads the WSDL file 312, the client program 302 can use the SOAP interface 314 to communicate with the traffic manager 300. Typically, the client program 302 transmits a SOAP message 320 through the SOAP interface 314. The SOAP message can be a request for one or more services from the server program 304. The SOAP message 320 can, for example, include data in an XML format. The SOAP message may also include other attachments (e.g., .gif files, .wav files, etc.).

The traffic manager 300 can, in turn, perform a variety of operations on the SOAP message 320. For example, the traffic manager 300 may discard, hold, store, or forward the SOAP message 320. The traffic manager 300 may also transform the SOAP message 320 into another SOAP message 322 which is sent to the server program 304 and/or one or more other programs (not shown) in the distributed computing environment 301.

As noted above, the SOAP message 320 can be a request for one or more services. Accordingly, the traffic manager 300, among other things, can determine whether a request for invocation of the same and/or different services should be made from the server program 304 and/or other server programs (not shown) in the distributed computing environment 301. This determination can be made at least partially based on the data stored in the persistent storage 315. Based on this determination, the traffic manager 300 can map a request made by the client program 302 through the SOAP Interface 314 to a request for services from the server program 304 through the SOAP Interface 308. In other words, a SOAP message 322 can be generated by the traffic manager 300 and transmitted to the server program 304 and/or other server programs (not shown). The SOAP message 322 corresponds to the SOAP message 320 and can be a request for the same or different set of services provided by the server program 304. Accordingly, the traffic manager 300 can monitor the data traffic between the client program 302 and server program 304 and/or other server or client programs in the distributed computing environment 301.

Moreover, the traffic manager 300 can be used to manage the services provided by the server program 304 and/or other server programs in the distributed computing environment 301. This allows the services which are offered by the server program to be mapped to possibly a different set of services which are actually provided to the client program 302. This provides control over the access of services in a distributed computing environment and allows implementation of various policies across different computing nodes which typically possess one or more disparate characteristics.

Figure 3C:
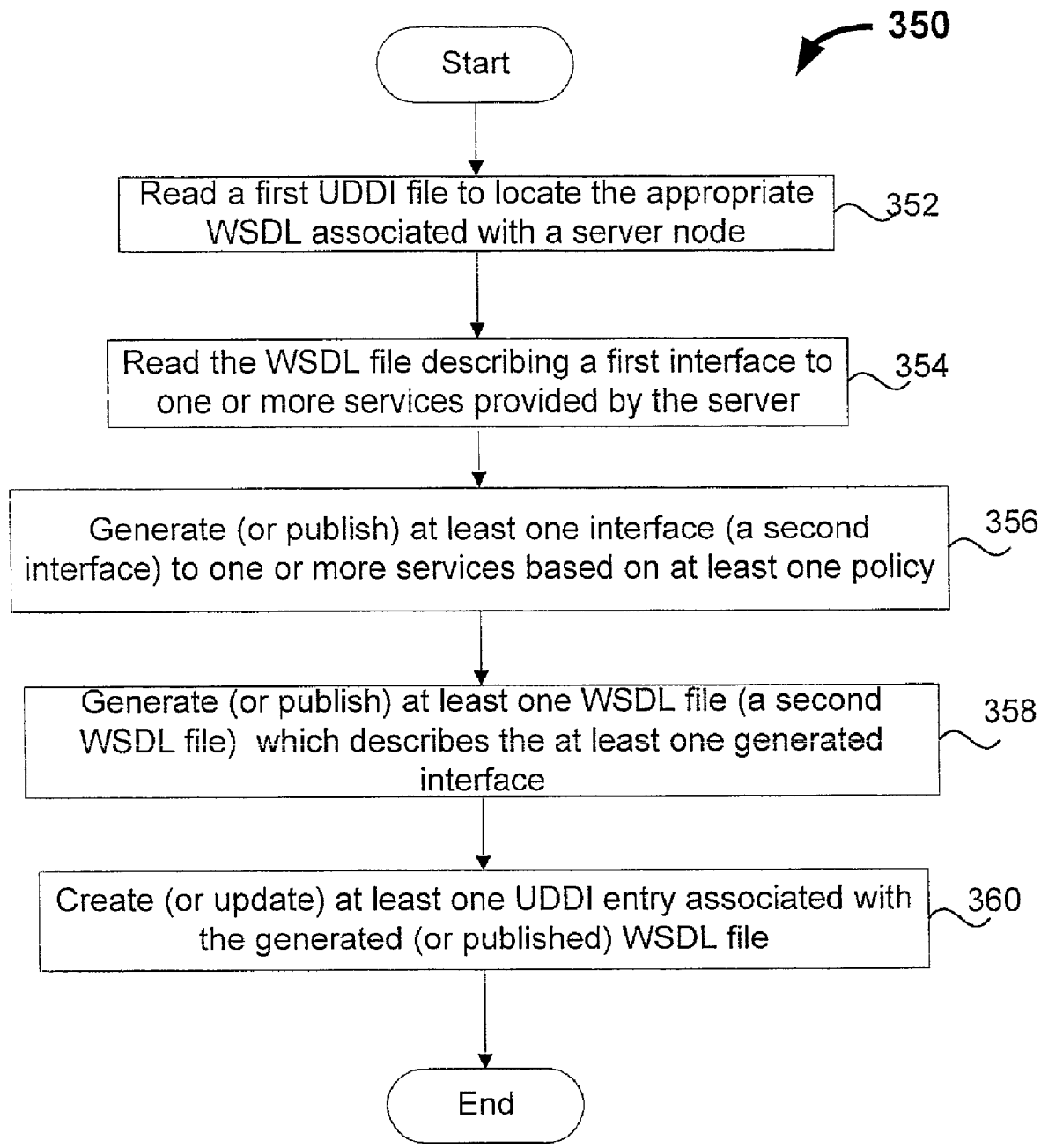
FIG. 3C illustrates a method for facilitating communication between a client node and a server node in a distributed computing environment in accordance with one embodiment of the invention.

FIG. 3C illustrates a method 350 for facilitating communication between a client node and a server node in a distributed computing environment. The method 350 can, for example, be used by the traffic manager 300 of FIGS. 3A and 3B. Initially, at operation 352, a first UDDI is read to locate the appropriate WSDL file associated with an interface to one or more server programs. Next, at operation 354, the WSDL file is read. The WSDL file typically describes a first interface which can be used to access one or more services provided by one or more server programs. Thereafter, at operation 356, at least one interface (a second interface) is generated (or published) based on at least one policy. This provides one or more interfaces to the services provided by the one or more servers. Accordingly, security mapping function can be abstracted and centralized. Again, this avoids the redundancy and inefficiency inherent in building these capabilities in each node, particularly in complex systems. Furthermore, control over enforcement of Information Technology (IT) and/or business policies and procedures can be achieved. It should be noted that this can be achieved when the interfaces are compatible or incompatible.

Accordingly, at operation 358, a second WSDL file which describes the at least one generated (or published) interface is generated (or published). Finally, at operation 360, at least one UDDI entry associated with the generated (or published) WSDL file is created (or updated). The method 350 ends following operation 360.

Figure 3D:
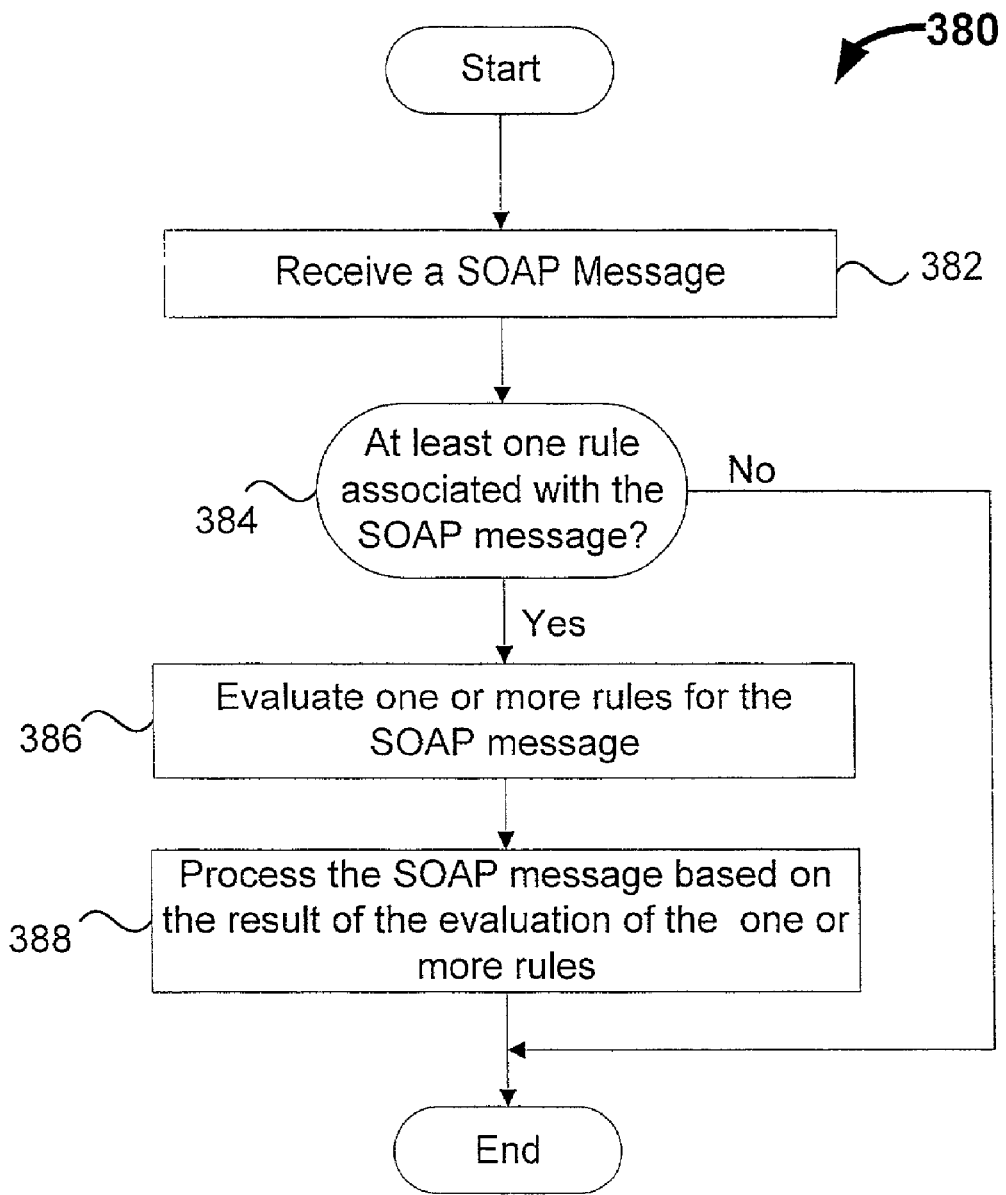
FIG. 3D illustrates a method for processing SOAP messages in accordance with one embodiment of the invention.

FIG. 3D illustrates a method 380 for processing SOAP messages in accordance with one embodiment of the invention. The method 380 can, for example, be used by the traffic manager 300 of FIGS. 3A and 3B. Initially, at operation 382, a SOAP message is received. Next, at operation 384, a determination is made as to whether at least one rule is associated with the SOAP message. Such rules are typically generated with reference to one or more policies. If it is determined at operation 384 that no rule is associated with the SOAP message, the method 380 ends. However, if it is determined at operation 384 that at least one rule is associated with the SOAP message, the method 380 proceeds to operation 386 where any such rule is evaluated for the SOAP message. Thereafter, at operation 388, the SOAP message is processed based on the result of the evaluation. The method 380 ends following operation 388.

Figure 4:
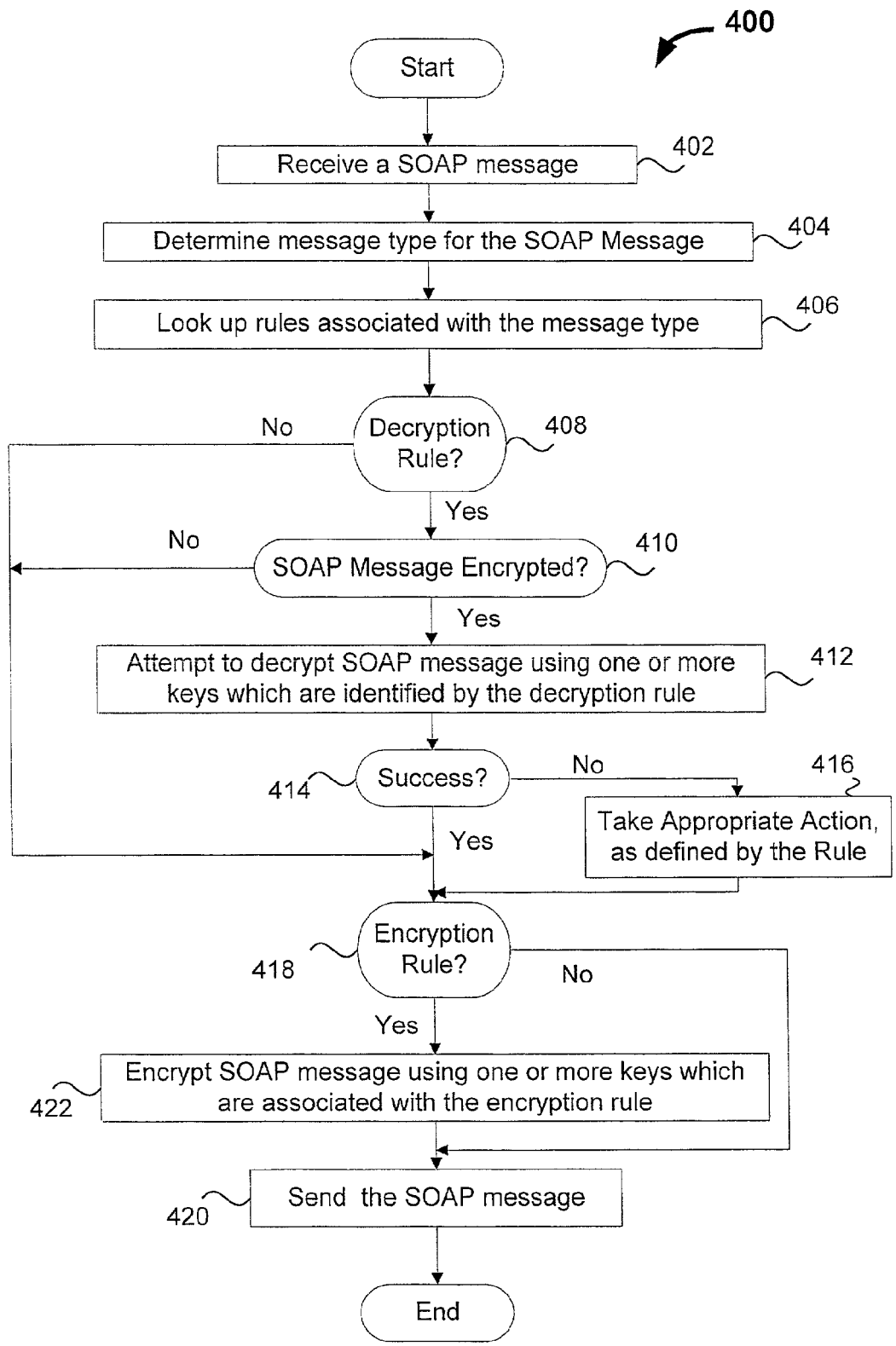
FIG. 4 illustrates a security method suitable for providing security for SOAP messages exchanged between a client and a server program in accordance with one embodiment of the invention.

As noted above, one aspect of the invention allows implementation of various policies across different computing nodes which typically possess one or more disparate characteristics. By way of example, FIG. 4 illustrates a security method 400 suitable for providing security for SOAP messages exchanged between a client and a server program in accordance with one embodiment of the invention. As will be appreciated, the security method 400, for example, is suitable for providing a security model mapping between the client and server programs which operate in a distributed operating environment. Accordingly, security mapping function can be abstracted and centralized so a single node or set of nodes which are responsible for affecting the communications between disparate nodes. Again, this avoids the redundancy and inefficiency inherent in building these capabilities in each node, particularly in complex systems.

Referring to back to FIG. 4, initially, at operation 402, a SOAP message is received. Next, at operation 404, a message type is determined for the SOAP message. Thereafter, at operation 406, the rules associated with the message type are looked up. Accordingly, at operation 408, a determination is made as to whether at least one decryption rule is associated with the SOAP message. If it is determined at operation 408 that at least one decryption rule is associated with the SOAP message, the security method 400 proceeds to operation 410 where a determination is made as to whether the SOAP message is encrypted. If it is determined at operation 410 that the SOAP message is encrypted, the security method 400 proceeds to operation 412 where an attempt is made to decrypt the SOAP message using one or more keys which are identified by at least one decryption rule. The decryption keys typically correspond to (or are managed by) an organization or an organizational rule.

Next, at operation 414, a determination is made as to whether the attempt to decrypt the SOAP message was successful. If it is determined at operation 414 that the attempt to decrypt the SOAP message was not successful, the security method 400 proceeds to operation 416 where appropriate action is taken, as defined by the decryption rule. For example, an alarm can be sent. However, operation 416 is bypassed if it is determined at operation 414 that the attempt to decrypt the SOAP message was successful.

In any case, following operation 416 or directly from operations 408, 410 or 414, the security method 400 can proceed to operation 418 where a determination is made as to whether at least one encryption rule is associated with the SOAP message. If it is determined at operation 418 that no encryption rule is associated with the SOAP message, the security method 400 proceeds to operation 420 where the SOAP message is sent to one or more server programs. The security method 400 ends following operation 420. However, if it is determined at operation 418 that at least one encryption rule is associated with the SOAP message, the security method 400 proceeds to operation 422 where the SOAP message is encrypted using one or more keys which are associated with the encryption rule before the message is sent to one or more server programs at operation 420. In any case, the security method 400 ends following operation 420.

Figure 5:
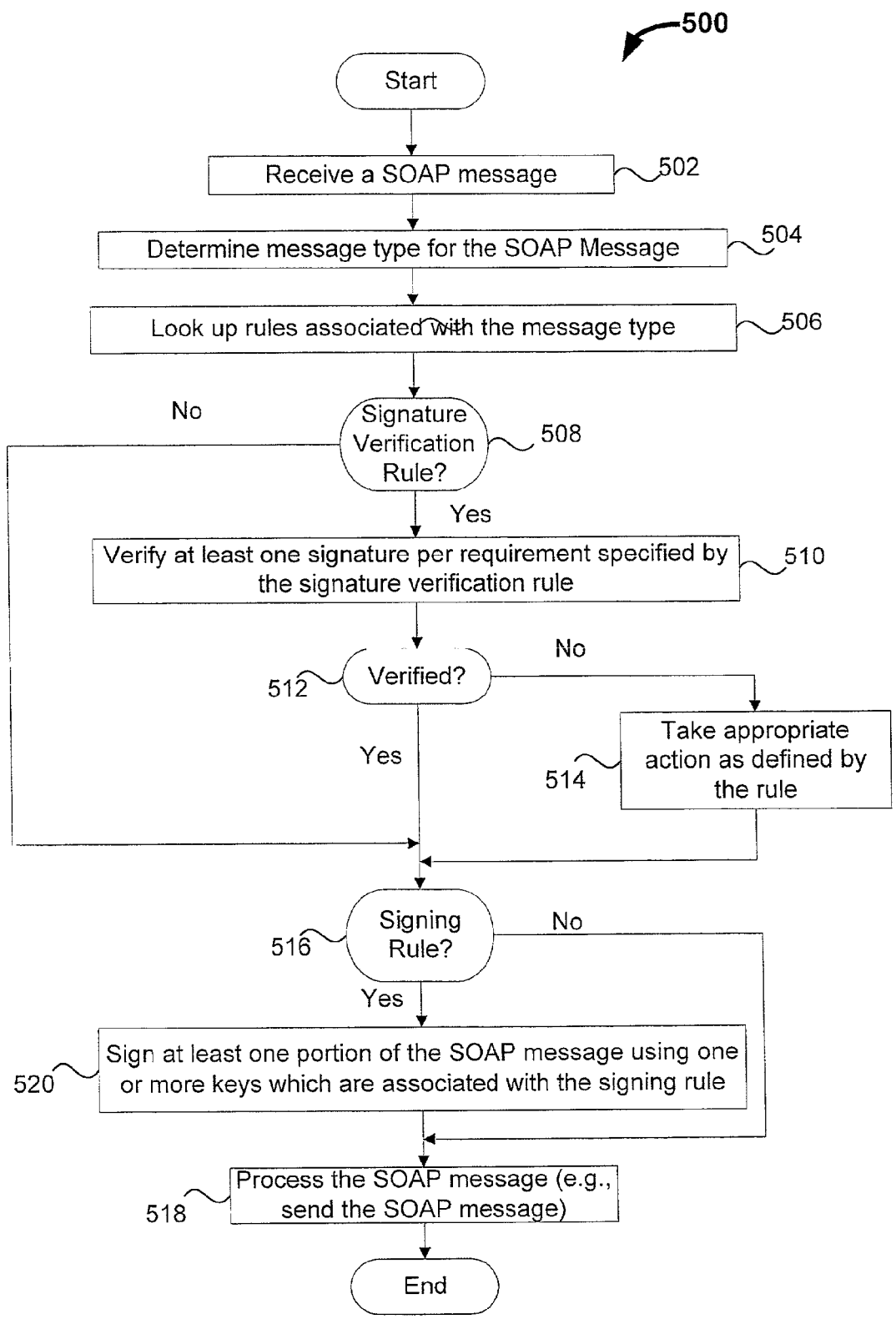
FIG. 5 illustrates a security method suitable for providing security for SOAP messages exchanged between a client and a server program in accordance with another embodiment of the invention.

FIG. 5 illustrates a security method 500 suitable for providing security for SOAP messages exchanged between a client and a server program in accordance with another embodiment of the invention. Similar to the security method 400 of FIG. 4, the security method 500, for example, is suitable for providing a security model mapping between the client and server programs which operate in a distributed operating environment. Accordingly, security mapping function can be abstracted and centralized so a single node or set of nodes which are responsible for affecting the communications between disparate nodes. Again, this avoids the redundancy and inefficiency inherent in building these capabilities in each node, particularly in complex systems.

According to a specific embodiment, the security method 500 can, for example, be used to verify signatures and/or sign messages using keys (or identifiers) which are recognized or used by the client and server programs. Initially, at operation 502, a SOAP message is received. Next, at operation 504, a message type is determined for the SOAP message. Thereafter, at operation 506, the rules associated with the message type are looked up. Accordingly, at operation 508, a determination is made as to whether at least one signature verification rule is associated with the SOAP message. If it is determined at operation 508 that a signature verification rule is associated with the SOAP message, the security method 500 proceeds to operation 510 where at least one signature associated with the SOAP message is verified according to the at least one signature verification rule. Next, at operation 512, a determination is made as to whether the signatures have successfully been verified. If it is determined at operation 512 that the one or more signatures have not been successfully verified, the security method 500 proceeds to operation 514 where appropriate action is taken as defined by the signature verification rule. For example, an alarm can be sent. Thereafter, the security method 500 proceeds to operation 516 where a determination is made as to whether there is at least one signing rule associated with the SOAP message. It should be noted that if it is determined at operation 512 that the one or more signatures have been successfully verified, the security method 500 bypasses operation 514 and proceeds directly to operation 516. It should also be noted that if it is determined at operation 508 that there are no signature verification rules associated with the SOAP message, the security method 500 also directly proceeds to the operation 516.

If it is determined at operation 516 that there are no signing rules associated with the SOAP message, the security method 500 proceeds to operation 518 where the SOAP message is processed (e.g., the SOAP message is sent to one or more servers). The method 500 ends following operation 518. However, if it is determined at operation 516 that there is at least one signing rule associated with the SOAP message, the security method 500 proceeds to operation 520 where at least one portion of the SOAP message is signed using one or more keys which are associated with the at least one signing rule. Thereafter, at operation 518 the SOAP message is processed. The method 500 ends following the operation 518.

Figure 6:
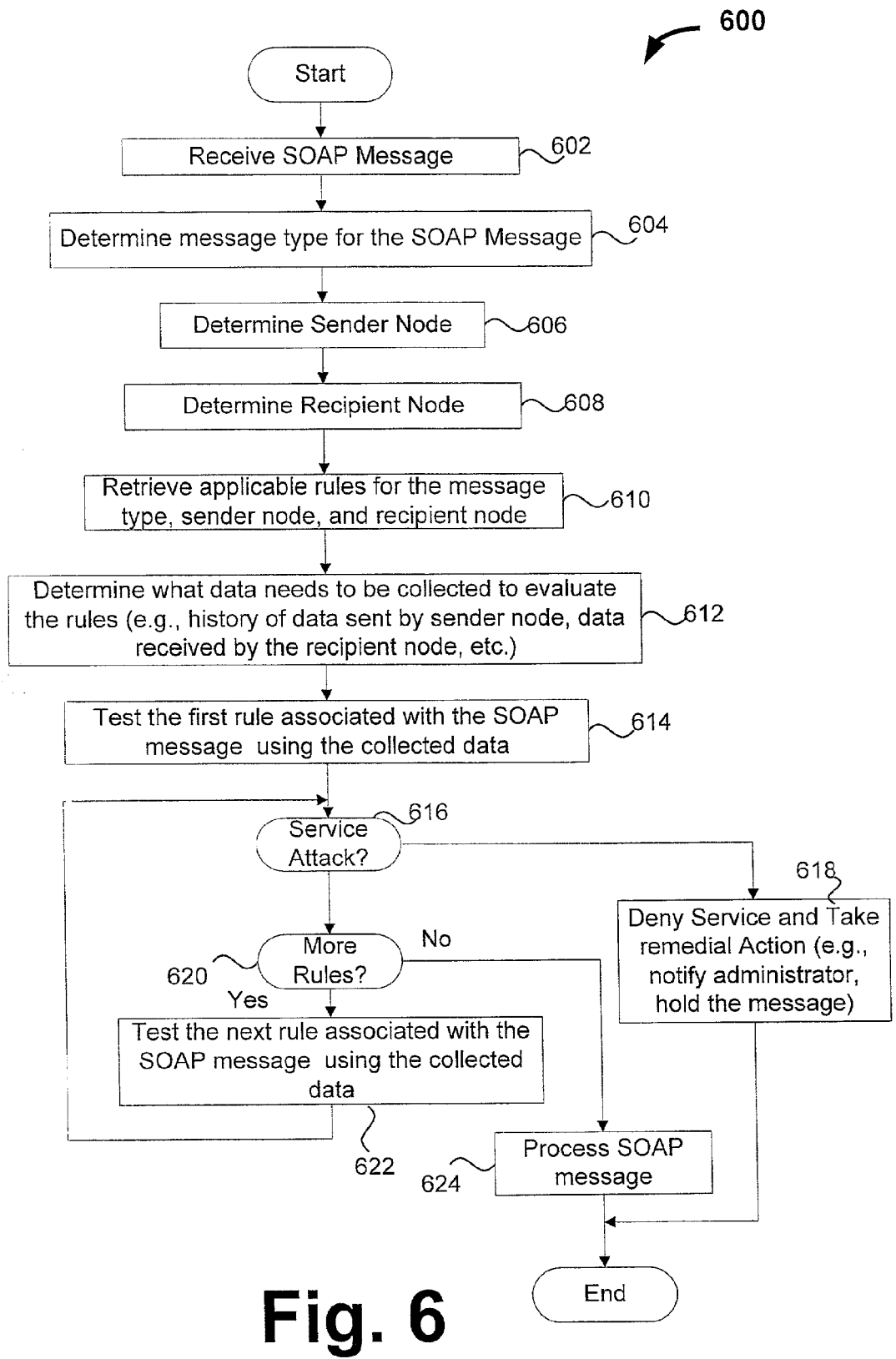
FIG. 6 illustrates a security method for providing security for server programs running in one or more computing nodes in accordance with yet another embodiment of the invention.

FIG. 6 illustrates a security method 600 for providing security for server programs running in one or more computing nodes in accordance with yet another embodiment of the invention. The security method 600 can, for example, be used by the traffic manager 300 of FIGS. 3A and 3B. As will be appreciated, the method 600 is especially suited for protecting server programs against service attacks which are typically initiated by one or more client programs. Initially, at operation 602, a SOAP message is received. The SOAP message is typically a request for one or more services from one or more server programs. Next, at operations 604, 606 and 608 the message type, sender node, and recipient node are respectively determined. Thereafter, at operation 610, applicable rules for the message type, sender node, and recipient node are retrieved. Accordingly, at operation 612, a determination is made as to whether data needs to be collected to evaluate the retrieved rules. The determination made at operation 612 can, for example, determine the extent of the history (or log) for the SOAP messages that need to be considered. Histories (or logs) can be maintained for various message categories. These message categories can, for example, include messages of a particular type, all messages sent by a sender node, messages received by the recipient node, etc.

In any case, after data has been collected, the security method 600 proceeds to operation 614 where the first rule associated with the SOAP message is tested using the collected data. Next, at operation 616, a determination is made as to whether the first rule indicates that a service attack has been made. If it is determined at operation 616 that a service attack has been made, the security method 600 proceeds to operation 618 where service is denied and remedial action is taken. The remedial action taken can, for example, include notifying an administrator, holding the SOAP message, etc. The security method 600 ends following operation 618.

On the other hand, if it is determined at operation 616 that the first rule does not indicate a service attack, the security method 600 proceeds to operation 620 where a determination is made as to whether there are more rules associated with the SOAP message. If it is determined at operation 620 that there are no additional rules associated with the SOAP message, the security method 600 proceeds to operation 624 where the SOAP message is processed (e.g., transformed and/or forwarded). The security method 600 ends following operation 624.

However, if it determined at operation 620 that there is at least one additional rule associated with the SOAP message, the security method 600 proceeds to operation 622 where the next rule associated with the SOAP message is tested using the collected data. Next, the security method 600 proceeds to operation 616 where a determination is made as to whether the rule indicates a service attack. Thereafter, the security method 600 proceeds in the same manner as discussed above. The security method 600 ends either following operation 618 where service is denied and remedial action is taken or after the operation 624 where the SOAP message is processed.

As will be appreciated, one aspect of the invention allows for the enforcement of various policies with respect to the various services provided in a distributed computing environment. In one embodiment, a traffic manager (e.g., traffic manager 300 of FIGS. 3A and 3B) is used to facilitate control over access and/or publication of SOAP interfaces. The traffic manager provides a user interface which is used to interact with the traffic manager. The user interface can be used, for example, by a programmer to make a request with respect to a particular SOAP interface (e.g., publication of a new SOAP interface, modification and/or access to an existing SOAP interface, etc.). The traffic manager may also facilitate the approval process of such requests. That is, the traffic manager can provide a user interface that can be used, for example, by an administrator to facilitate the approval process through interaction with the user interface.

Figure 7:
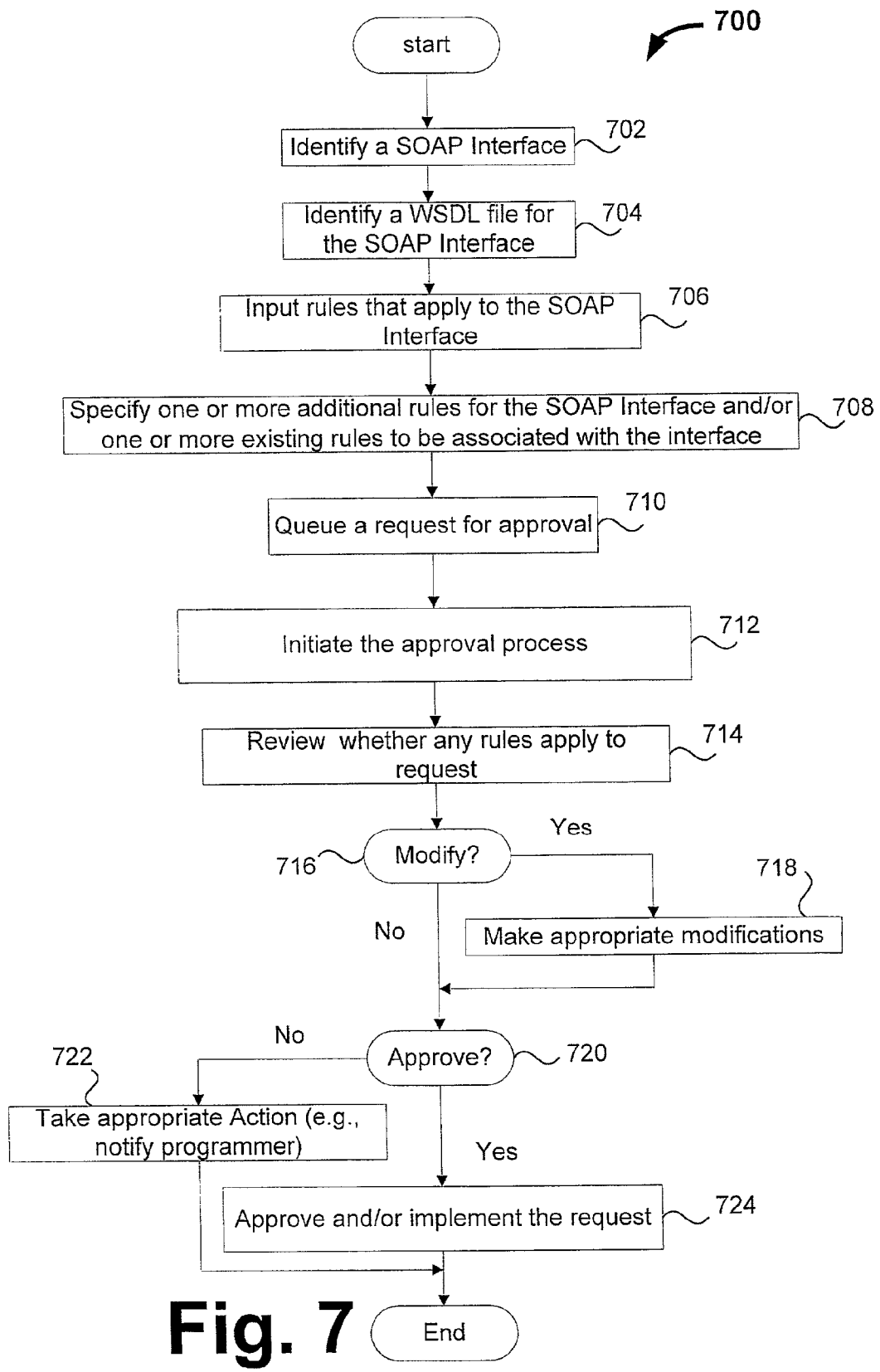
FIG. 7 illustrates a method for controlling access to and/or publication of SOAP interfaces.

FIG. 7 illustrates a method 700 for controlling access to and/or publication of SOAP interfaces. The method 700 can, for example, be used by the traffic manager 300 of FIGS. 3A and 3B. This allows centralized control over the access to and/or publication of the SOAP interfaces. As will be appreciated, this allows implementation and enforcement of policies with respect to access to and/or publication of the SOAP interfaces. Moreover, these policies can be implemented while avoiding the redundancy and inefficiencies inherent in conventional approaches.

Referring back to FIG. 7, initially, at operation 702, a SOAP interface is identified. The SOAP interface can, for example, be a pre-existing SOAP interface or a SOAP interface which has just been developed. By way of example, a programmer (or developer) may identify the SOAP interface by interacting with a user interface of a traffic manager which facilitates the process of controlling access and/or publication of SOAP interfaces. The programmer may, for example, identify a newly developed SOAP interface in order to request approval for publication of the SOAP interface. Alternatively, the programmer may seek permission to access an existing SOAP interface and/or request modifications to it, and so forth.

Similarly, at operation 704, a WSDL file for the SOAP interface is identified. Next, at operation 706, the rules which apply to the SOAP interface are input. This operation can be performed, for example, by the programmer through a user interface associated with the SOAP traffic manager. The SOAP traffic manager can perform a search and output the rules which apply to the SOAP interface. Next, at operation 708, one or more additional rules for the SOAP interface and/or existing rules to be associated with the interface are specified. Again, this operation can be performed, for example, by the programmer through a user interface associated with the SOAP traffic manager.

At operation 710, a request is queued for approval. Next, at operation 712, the approval process for the request is initiated. The approval process can, for example, be initiated by an administrator. The administrator can interact with a user interface of the SOAP traffic manager which facilitates the approval process. At operation 714, a review is made as to whether any existing rules apply to the request (e.g., whether any rules apply to the identified SOAP interface). Again, this determination can, for example, be made by the administrator who uses an interface of the SOAP traffic manager to initiate a search for the applicable rules.

At operation 716 a determination is made as to whether any modifications should be made to what has been requested for approval (e.g., whether modification should be made to the SOAP interface and/or one or more rules). If it is determined at operation 716 that there is a need to make modifications to what has been requested for approval, the method 700 proceeds to operation 718 where appropriate modifications to the request can be made. Next, the method 700 proceeds to operation 720 where a determination is made as to whether the request should be approved. It should be noted that if it is determined at operation 716 that there is no need to make any modifications, the method 700 bypasses operation 718 and proceeds directly to operation 720 where a determination is made as to whether the request should be approved.

In any case, if it is determined at operation 720 that the request should not be approved, the method 700 proceeds to operation 722 where appropriate action can be taken (e.g., the programmer who made the request can be notified). The method 700 ends following operation 722. However, if it is determined at operation 720 that the request should be approved, the method 700 proceeds to operation 724 where the request is approved and/or implemented (e.g., a SOAP interface is published, access to the SOAP interface is allowed, new rules or modification to rules are in effect, etc.). The method 700 ends following operation 724.

Yet another aspect of the invention provides for conditional data processing (or conditional data flow) of messages exchanged between client and server programs in a distributed computing environment. The conditional data processing (or conditional data flow) of messages is another example of the many functionalities that can be provided using the invention. Moreover, this functionality can be abstracted and centralized so as to avoid the redundancy and inefficiency inherent in building these capabilities into each node, particularly in complex systems. Another advantage is that control over enforcement of Information Technology (IT) and/or business policies and procedures can be achieved. This can be achieved when the interfaces are compatible or incompatible.

Figure 8:
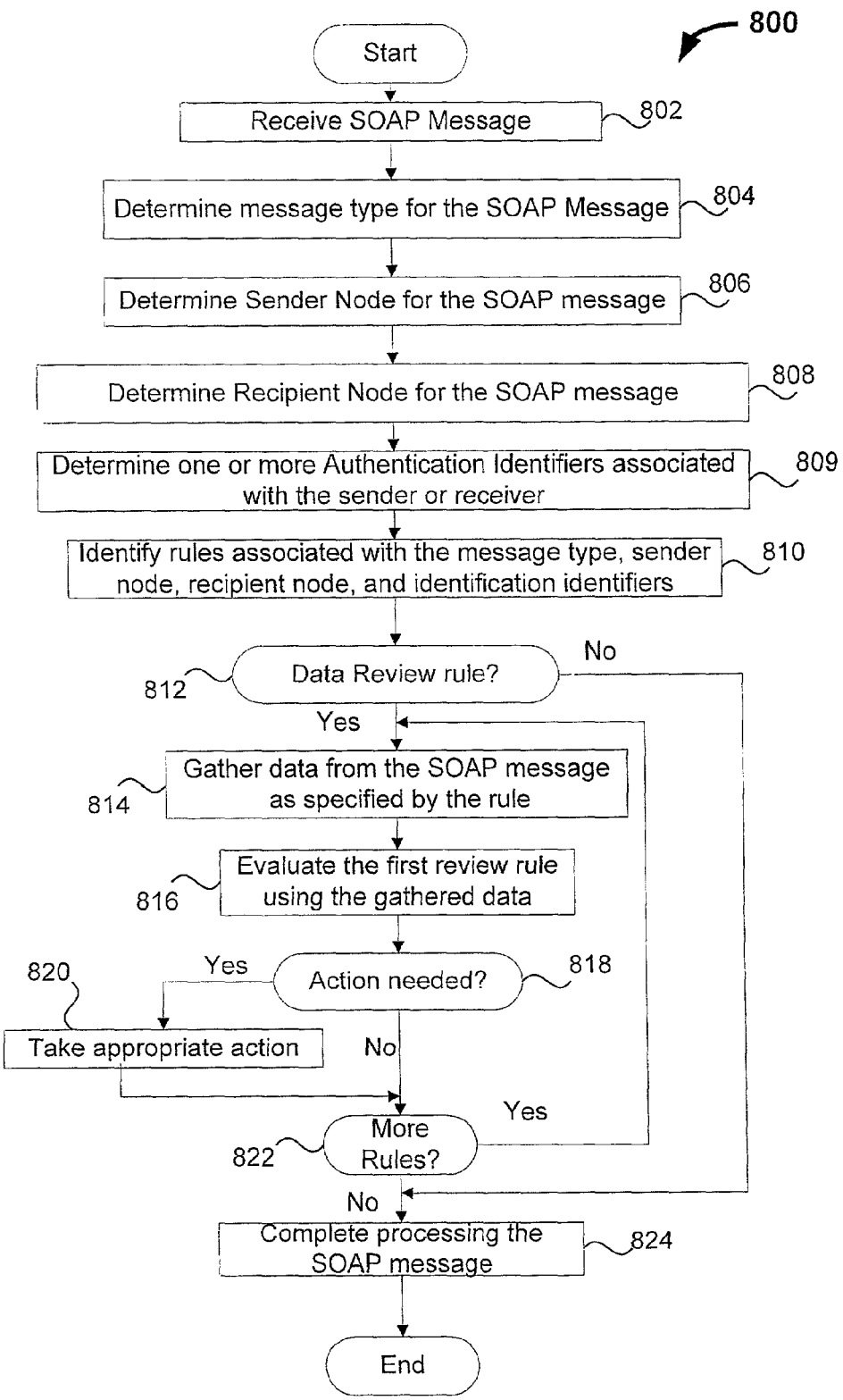
FIG. 8 illustrates a processing method for processing SOAP messages in accordance with one embodiment of the invention.

FIG. 8 illustrates a processing method 800 for processing SOAP messages in accordance with one embodiment of the invention. The processing method 800 can, for example, be used by the traffic manager 300 of FIGS. 3A and 3B. Initially, at operation 802 a SOAP message is received. Next, at operations 804, 806 and 808, the message type, sender node, and recipient node are respectively determined. At operation 809, one or more authentication identifiers are determined. The authentication identifiers can, for example, be associated with the sender or receiver nodes. Thereafter, at operation 810, any rules associated with the message type, sender node, and recipient node are identified. Accordingly, at operation 812, a determination is made as to whether at least one data review or conditional flow rule is associated with the SOAP message. If it is determined at operation 812 that at least one rule is associated with the SOAP message, the processing method 800 proceeds to operation 814 where data is gathered from the SOAP message as specified by the data review/conditional flow rule. Next, at operation 816, the data review/conditional flow rule is evaluated using the data gathered from the SOAP message.

Accordingly, at operation 818, a determination is made as to whether action is required. If it is determined at operation 818 that action is required, the processing method 800 proceeds to operation 820 where appropriate action can be taken. These actions can, for example, include holding the SOAP message, archiving the SOAP message, failing SOAP message delivery, sending a notification, logging special notification, modifying the data in the message, sending side-effect SOAP messages, invoking Java methods and so on.

After appropriate action is taken, the processing method 800 proceeds to operation 822 where a determination is made as to whether there are more data review/conditional flow rules to evaluate. It should be noted that if it is determined at operation 818 that no action is required, the processing method 800 bypasses operation 820 and directly proceeds to operation 822.

If it is determined at operation 822 that there is at least one data review/conditional flow rule to evaluate, the processing method 800 proceeds to operation 814 where data is gathered from the SOAP message as specified by the data review/conditional flow rule. Thereafter, the processing method 800 proceeds in a similar manner as discussed above. On the other hand, if it is determined at operation 822 that there are no data review/conditional flow rules to evaluate, the processing method 800 proceeds to 824 where the processing of the SOAP message is completed (e.g., the SOAP message is delivered). The processing method 800 ends following operation 824.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. For example, several embodiments of the invention are described with reference to SOAP and SOAP interfaces. It will be understood, however, that the scope of the present invention includes other protocols and mechanisms by which the interaction of disparate nodes in a distributed computing environment may be facilitated. Hence, all suitable modifications and equivalents may be resorted to as falling within the scope of the invention.

What is claimed is:

1. A computer-implemented method of implementing security for Simple Object Access Protocol (SOAP) messages which can be exchanged between client and server programs, the method comprising:

receiving a SOAP message;

determining whether at least one security rule has been defined for the SOAP message, the at least one security rule being defined based on a security policy for exchanging SOAP messages between at least one client program and at least one server program, wherein the at least one security rule includes at least one decryption rule; and performing at least one security related operation on the SOAP message based on the at least one security rule when the determining determines that at least one security rule is associated with the SOAP message, wherein the performing of the at least one operation comprises:

determining whether the SOAP message is encrypted, and decrypting the SOAP message based on one or more decryption keys which are associated with the at least one decryption rule.

2. A method as recited in claim 1, wherein the one or more decryption keys are managed by an organization or define an organizational rule.

3. A method as recited in claim 1, wherein the method further comprises:

determining whether the SOAP message has been decrypted successfully; and taking appropriate action when the determining determines that the SOAP message has not been decrypted successfully.

4. A computer-implemented method of implementing security for Simple Object Access Protocol (SOAP) messages which can be exchanged between client and server programs, the method comprising:

receiving a SOAP message;

determining whether at least one security rule has been defined for the SOAP message, he at least one security rule being defined based on a security policy for exchanging SOAP messages between at least one client program and at least one server program, wherein the at least one security rule includes at least one encryption rule; and performing at least one security related operation on the SOAP message based on the at least one security rule when the determining determines that at least one security rule is associated with the SOAP message, wherein the performing of at least one operation comprises:

encrypting the SOAP message based on one or more encryption keys which are associated with the at least one encryption rule.

5. A method as recited in claim 4, wherein the one or more encryption keys are associated with an individual.

6. A computer-implemented method of implementing security for Simple Object Access Protocol (SOAP) messages exchanged between client and server programs, the method comprising:

receiving a SOAP message;

determining whether at least one decryption rule is associated with the SOAP message;

attempting to decrypt the SOAP message using one or more keys associated with the at least one decryption rule when the determining determines that at least one decryption rule is associated with the SOAP message;

determining whether at least one encryption rule is associated with the SOAP message;

encrypting the SOAP message using one or more keys associated with the at least one decryption rule when the determining determines that at least one encryption rule is associated with the SOAP message;

determining whether at least one signature verification rule is associated with the SOAP message;

verifying at least one signature associated with the SOAP message per requirements specified by the at least one signature verification rule when the determining determines that at least one signature verification rule is associated with the SOAP message;

determining whether at least one signing rule is associated with the SOAP message; and signing the SOAP message using one or more keys associated with the at least one signing rule.

7. A method as recited in claim 6, wherein the method further comprises:

determining a message type for the SOAP message, and looking up rules which are associated with the message type.

8. A method as recited in claim 6, wherein at least one portion of the SOAP message is XML.

9. A method as recited in claim 6, wherein the method further comprises:

determining whether the SOAP message is encrypted before attempting to decrypt the SOAP message;

determining whether the SOAP message has been decrypted successfully; and taking appropriate action when the determining determines that the SOAP message has not been decrypted successfully.

10. A method as recited in claim 6, wherein the method further comprises:

determining whether the at least one signature associated with the SOAP message has successfully been verified; and taking appropriate action when the determining determines that the at least one signature has not been successfully verified.

11. A computer readable medium having computer program instructions stored therein for performing a method of implementing security for Simple Object Access Protocol (SOAP) messages exchanged between client and server programs, the method comprising:

receiving a SOAP message;

determining whether at least one decryption rule is associated with the SOAP message;

attempting to decrypt the SOAP message using one or more keys associated with the at least one decryption rule when the determining determines that at least one decryption rule is associated with the SOAP message;

determining whether at least one encryption rule is associated with the SOAP message;

encrypting the SOAP message using one or more keys associated with the at least one decryption rule when the determining determines that at least one encryption rule is associated with the SOAP message;

determining whether at least one signature verification rule is associated with the SOAP message;

verifying at least one signature associated with the SOAP message per requirements specified by the at least one signature verification rule when the determining determines that at least one signature verification rule is associated with the SOAP message;

determining whether at least one signing rule is associated with the SOAP message; and signing the SOAP message using one or more keys associated with the at least one signing rule.

12. The computer readable medium of claim 11, wherein the method further comprises:
determining a message type for the SOAP message, and
looking up rules which are associated with the message type.

13. The computer readable medium of claim 11, wherein at least one portion of the SOAP message is XML.

14. The computer readable medium of claim 11, wherein the method further comprises:
determining whether the SOAP message is encrypted before attempting to decrypt the SOAP message;
determining whether the SOAP message has been decrypted successfully; and
taking appropriate action when the determining determines that the SOAP message has not been decrypted successfully.

15. The computer readable medium of claim 11, wherein the method further comprises:
determining whether the at least one signature associated with the SOAP message has successfully been verified; and
taking appropriate action when the determining determines that the at least one signature has not been successfully verified.

16. A traffic manager for facilitating communication between a client node and a server node in a distributed computing environment, the server node having a first interface associated therewith which is incompatible with direct communications generated by the client node, the traffic manager comprising a central processing unit which can operate to:
receive a Simple Object Access Protocol (SOAP) message;
determine whether at least one decryption rule is associated with the SOAP message;
attempt to decrypt the SOAP message using one or more keys associated with the at least one decryption rule when the determining determines that at least one decryption rule is associated with the SOAP message;
determine whether at least one encryption rule is associated with the SOAP message;
encrypt the SOAP message using one or more keys associated with the at least one decryption rule when the determining determines that at least one encryption rule is associated with the SOAP message;
determine whether at least one signature verification rule is associated with the SOAP message;
verify at least one signature associated with the SOAP message per requirements specified by the at least one signature verification rule when the determining determines that at least one signature verification rule is associated with the SOAP message;
determine whether at least one signing rule is associated with the SOAP message; and
sign the SOAP message using one or more keys associated with the at least one signing rule.

17. The traffic manager of claim 16, wherein the central processing unit can further operate to:
determine a message type for the SOAP message, and
look up rules which are associated with the message type.

18. The traffic manager of claim 16, wherein at least one portion of the SOAP message is XML.

19. The traffic manager of claim 16, wherein the central processing unit can further operate to:
determine whether the SOAP message is encrypted before attempting to decrypt the SOAP message;
determine whether the SOAP message has been decrypted successfully; and
take appropriate action when the determining determines that the SOAP message has not been decrypted successfully.

20. The traffic manager of claim 16, wherein the central processing unit can further operate to:
determine whether the at least one signature associated with the SOAP message has successfully been verified; and
take appropriate action when the determining determines that the at least one signature has not been successfully verified.

21. A computer readable medium having computer program instructions stored therein for performing a method of implementing security for Simple Object Access Protocol (SOAP) messages which can be exchanged between client and server programs, the method comprising:
receiving a SOAP message;
determining whether at least one security rule has been defined for the SOAP message, the at least one security rule being defined based on a security policy for exchanging SOAP messages between at least one client program and at least one server program, wherein the at least one security rule includes at least one decryption rule; and
performing at least one security related operation on the SOAP message based on the at least one security rule when the determining determines that at least one security rule is associated with the SOAP message, wherein the performing of the at least one operation comprises:
determining whether the SOAP message is encrypted, and
decrypting the SOAP message based on one or more decryption keys which are associated with the at least one decryption rule.

22. The computer readable medium of claim 21, wherein the one or more decryption keys are managed by an organization or define an organizational rule.

23. The computer readable medium of claim 21, wherein the method further comprises:
determining whether the SOAP message has been decrypted successfully; and
taking appropriate action when the determining determines that the SOAP message has not been decrypted successfully.

24. A traffic manager for facilitating communication between a client node and a server node in a distributed computing environment, the server node having a first interface associated therewith which is incompatible with direct communications generated by the client node, the traffic manager comprising a central processing unit which can operate to:

receive a Simple Object Access Protocol (SOAP) message;

determine whether at least one security rule has been defined for the SOAP message, the at least one security rule being defined based on a security policy for exchanging SOAP messages between at least one client program and at least one server program, wherein the at least one security rule includes at least one decryption rule; and perform at least one security related operation on the SOAP message based on the at least one security rule when the determining determines that at least one security rule is associated with the SOAP message, wherein the performing of the at least one operation comprises:

determining whether the SOAP message is encrypted, and decrypting the SOAP message based on one or more decryption keys which are associated with the at least one decryption rule.

25. The traffic manager of claim 24, wherein the one or more decryption keys are managed by an organization or define an organizational rule.

26. The traffic manager of claim 24, wherein the central processing unit can further operate to:

determine whether the SOAP message has been decrypted successfully; and take appropriate action when the determining determines that the SOAP message has not been decrypted successfully.

27. A computer readable medium having computer program instructions stored therein for performing a method of implementing security for Simple Object Access Protocol (SOAP) messages which can be exchanged between client and server programs, the method comprising:

receiving a SOAP message;

determining whether at least one security rule has been defined for the SOAP message, the at least one security rule being defined based on a security policy for exchanging SOAP messages between at least one client program and at least one server program, wherein the at least one security rule includes at least one encryption rule; and performing at least one security related operation on the SOAP message based on the at least one security rule when the determining determines that at least one security rule is associated with the SOAP message, wherein the performing of at least one operation comprises:

encrypting the SOAP message based on one or more encryption keys which are associated with the at least one encryption rule.

28. The computer readable medium of claim 27, wherein the one or more encryption keys are associated with an individual.

29. A traffic manager for facilitating communication between a client node and a server node in a distributed computing environment, the server node having a first interface associated therewith which is incompatible with direct communications generated by the client node, the traffic manager comprising a central processing unit which can operate to:

receive a Simple Object Access Protocol (SOAP) message;

determine whether at least one security rule has been defined for the SOAP message, the at least one security rule being defined based on a security policy for exchanging SOAP messages between at least one client program and at least one server program, wherein the at least one security rule includes at least one encryption rule; and perform at least one security related operation on the SOAP message based on the at least one security rule when the determining determines that at least one security rule is associated with the SOAP message, wherein the performing of at least one operation comprises:

encrypting the SOAP message based on one or more encryption keys which are associated with the at least one encryption rule.

30. The traffic manager of claim 29, wherein the one or more encryption keys are associated with an individual.

31. A computer-implemented method of implementing security for Simple Object Access Protocol (SOAP) messages exchanged between client and server programs, the method comprising:

receiving a SOAP message;

determining whether at least one decryption rule is associated with the SOAP message;

attempting to decrypt the SOAP message using one or more keys associated with the at least one decryption rule when the determining determines that at least one decryption rule is associated with the SOAP message;

determining whether at least one encryption rule is associated with the SOAP message; and encrypting the SOAP message using one or more keys associated with the at least one decryption rule when the determining determines that at least one encryption rule is associated with the SOAP message.

32. A method as recited in claim 31, wherein the method further comprises:

determining a message type for the SOAP message, and looking up rules which are associated with the message type.

33. A method as recited in claim 31, wherein at least one portion of the SOAP message is XML.

34. A method as recited in claim 31, wherein the method further comprises:

determining whether the SOAP message is encrypted before attempting to decrypt the SOAP message;

determining whether the SOAP message has been decrypted successfully; and taking appropriate action when the determining determines that the SOAP message has not been decrypted successfully.

35. A method as recited in claim 31, wherein the method further comprises:

determining whether the at least one signature associated with the SOAP message has successfully been verified; and taking appropriate action when the determining determines that the at least one signature has not been successfully verified.

36. A computer readable medium having computer program instructions stored therein for performing a method of implementing security for Simple Object Access Protocol (SOAP) messages exchanged between client and server programs, the method comprising:

receiving a SOAP message;

determining whether at least one decryption rule is associated with the SOAP message;

attempting to decrypt the SOAP message using one or more keys associated with the at least one decryption rule when the determining determines that at least one decryption rule is associated with the SOAP message;

determining whether at least one encryption rule is associated with the SOAP message; and encrypting the SOAP message using one or more keys associated with the at least one decryption rule when the determining determines that at least one encryption rule is associated with the SOAP message.

37. The computer readable medium of claim 36, wherein the method further comprises:

determining a message type for the SOAP message, and looking up rules which are associated with the message type.

38. The computer readable medium of claim 36, wherein at least one portion of the SOAP message is XML.

39. The computer readable medium of claim 36, wherein the method further comprises:

determining whether the SOAP message is encrypted before attempting to decrypt the SOAP message;

determining whether the SOAP message has been decrypted successfully; and taking appropriate action when the determining determines that the SOAP message has not been decrypted successfully.

40. The computer readable medium of claim 36, wherein the method further comprises:

determining whether the at least one signature associated with the SOAP message has successfully been verified; and taking appropriate action when the determining determines that the at least one signature has not been successfully verified.

41. A traffic manager for facilitating communication between a client node and a server node in a distributed computing environment, the server node having a first interface associated therewith which is incompatible with direct communications generated by the client node, the traffic manager comprising a central processing unit which can operate to:

receive a Simple Object Access Protocol (SOAP) message;

determine whether at least one decryption rule is associated with the SOAP message;

attempt to decrypt the SOAP message using one or more keys associated with the at least one decryption rule when the determining determines that at least one decryption rule is associated with the SOAP message;

determine whether at least one encryption rule is associated with the SOAP message; and encrypt the SOAP message using one or more keys associated with the at least one decryption rule when the determining determines that at least one encryption rule is associated with the SOAP message.

42. The traffic manager of claim 41, wherein the central processing unit can further operate to:

determine a message type for the SOAP message, and look up rules which are associated with the message type.

43. The traffic manager of claim 41, wherein at least one portion of the SOAP message is XML.

44. The traffic manager of claim 41, wherein the central processing unit can further operate to:

determine whether the SOAP message is encrypted before attempting to decrypt the SOAP message;

determine whether the SOAP message has been decrypted successfully; and take appropriate action when the determining determines that the SOAP message has not been decrypted successfully.

45. The traffic manager of claim 41, wherein the central processing unit can further operate to:

determine whether the at least one signature associated with the SOAP message has successfully been verified; and take appropriate action when the determining determines that the at least one signature has not been successfully verified.

* * * * *

UNITED STATES PATENT AND TRADEMARK OFFICE
CERTIFICATE OF CORRECTION

PATENT NO. : 7,480,799 B2 Page 1 of 1
APPLICATION NO. : 10/015502
DATED : January 20, 2009
INVENTOR(S) : Kerry Champion It is certified that error appears in the above-identified patent and that said Letters Patent is hereby corrected as shown below:

In claim 4, Column 13, line 59, delete "he" after "message" and replace with --the--

Signed and Sealed this

Fourteenth Day of April, 2009

JOHN DOLL
*Acting Director of the United States Patent and Trademark Office*